United States Patent
Yoo et al.

(10) Patent No.: US 9,429,448 B2
(45) Date of Patent: Aug. 30, 2016

(54) METHOD AND APPARATUS FOR CORRECTING METER DATA FOR ENHANCEMENT OF ELECTRICITY DATA MANAGEMENT OF PHOTOVOLTAIC MODULE

(71) Applicant: ELECTRONICS AND TELECOMMUNICATIONS RESEARCH INSTITUTE, Daejeon (KR)

(72) Inventors: Yoon-Sik Yoo, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 14/248,417

(22) Filed: Apr. 9, 2014

(65) Prior Publication Data

US 2014/0300488 A1    Oct. 9, 2014

(30) Foreign Application Priority Data

Apr. 9, 2013  (KR) .................. 10-2013-0038483

(51) Int. Cl.
*G08B 23/00* (2006.01)
*G01D 4/00* (2006.01)

(52) U.S. Cl.
CPC ............. *G01D 4/002* (2013.01); *Y02B 70/346* (2013.01); *Y02B 90/241* (2013.01); *Y02B 90/248* (2013.01); *Y04S 20/32* (2013.01); *Y04S 20/36* (2013.01); *Y04S 20/52* (2013.01); *Y04S 20/525* (2013.01)

(58) Field of Classification Search
CPC .... G01D 4/002; Y02B 70/346; Y02B 90/24; Y02B 90/241; Y04S 20/32; Y04S 20/30; Y04S 20/525
USPC ........................................ 340/870.02–870.03
See application file for complete search history.

(56) References Cited

U.S. PATENT DOCUMENTS

| 7,986,246 B2 * | 7/2011 | Angelis .................. | G01D 4/006 340/870.02 |
| 8,423,637 B2 * | 4/2013 | Vaswani ................ | G01D 4/004 709/223 |
| 2004/0264941 A1 * | 12/2004 | Hirasaka ............ | G11B 5/00813 386/273 |

(Continued)

FOREIGN PATENT DOCUMENTS

| JP | 2012-234335 A | 11/2012 |
| KR | 119980019249 A | 6/1998 |
| KR | 1020130005979 A | 1/2013 |

*Primary Examiner* — Hai Phan
*Assistant Examiner* — Royit Yu
(74) *Attorney, Agent, or Firm* — Ladas & Parry LLP

(57) ABSTRACT

An apparatus and a method of correcting meter data for enhancement of electricity data management in a remote automatic measuring environment of a photovoltaic module are disclosed. According to an exemplary embodiment, a meter reads energy usage of a consumer and transmits meter data on the energy usage to an automatic meter reading (AMR) server. A meter data management system monitors an error in the transmitted meter data and a non-reading interval and re-requests collection of an error in meter data and a non-reading interval to the AMR server. When an error and a non-reading interval are found even after meter data is collected on the re-requesting, the error in the meter data and the non-reading interval are corrected using an estimated approximate value based on a history of previous meter data accumulated in a database of the AMR server.

8 Claims, 6 Drawing Sheets

(56) References Cited

U.S. PATENT DOCUMENTS

| | | | | |
|---|---|---|---|---|
| 2007/0139219 A1* | 6/2007 | Crider | ............... | G01D 4/004 340/870.02 |
| 2009/0045976 A1* | 2/2009 | Zoldi | ............... | G01D 4/004 340/870.02 |
| 2010/0188256 A1* | 7/2010 | Cornwall | ............... | G01D 4/004 340/870.02 |
| 2011/0271032 A1* | 11/2011 | Yamada | ............... | G06F 11/106 711/102 |
| 2012/0068547 A1* | 3/2012 | Vermeersch | ............... | G05F 1/67 307/82 |
| 2013/0200702 A1* | 8/2013 | Schoppner | ............... | G06Q 50/06 307/24 |
| 2014/0023010 A1* | 1/2014 | Loehr | ............... | H04W 52/365 370/329 |
| 2014/0074670 A1* | 3/2014 | Garrity | ............... | G06Q 10/04 705/30 |
| 2015/0149097 A1* | 5/2015 | Wada | ............... | G06Q 10/04 702/45 |

* cited by examiner

METHOD AND APPARATUS FOR CORRECTING METER DATA FOR ENHANCEMENT OF ELECTRICITY DATA MANAGEMENT OF PHOTOVOLTAIC MODULE

CROSS-REFERENCE TO RELATED APPLICATION

This application claims the priority benefit of Korean Patent Application No. 10-2013-0038483, filed on Apr. 9, 2013, in the Korean Intellectual Property Office, the disclosure of which is incorporated herein by reference.

BACKGROUND

1. Field of the Invention

The present invention relates to a method and an apparatus for correcting meter data for enhancement of electricity data management in a remote automatic measuring environment of a photovoltaic module, and more particularly, to a method and an apparatus for dealing with demand response data on consumers in real time and stably managing electricity data by a meter data management system correcting meter data in a data non-reading interval when meter data is not properly collected due to an error in communication lines between automatic meter reading (AMR) servers of different companies and a meter and in meter data.

2. Description of the Related Art

A conventional automatic meter reading (AMR) server of a company remotely reads, collects and manages data on electricity, gas, water, hot water and heating usages from metering devices using the preinstalled communication infrastructure and charges consumers for the usages based on the data. Generally, remote AMR involves a metering device installed in each house or office, a central AMR server to manage read measurements, automatically charge customers based on read data and manage customers, and a communication unit for transmission to the AMR server. KR Patent Publication 10-1998-0019249 discloses a remote AMR system and a communication method of the same, which specifies an automated method of measuring electricity, gas and water usages of consumers and building a database.

In this conventional remote AMR technology, however, data in a reading interval may be unread due to errors in a communication medium between the metering device and the AMR server or in data transmission, causing problems with response to demand of consumers in real time or stable management of read data. As a result, data is read by the metering device but may not be securely transmitted to the AMR server, being transmitted to the meter data management system without verifying the validity of the data. Accordingly, the meter data management system may need to notify the AMR server of a data non-reading interval to request retransmission of meter data to the metering device, and to correct and enhance the meter data using a valid value of non-reading data when a non-reading interval is found even after the request.

SUMMARY

An aspect of the present invention is to provide a method, an apparatus and a system that monitor an error in meter data and a non-reading interval, by a meter data management system, which may occur when meter data on electricity, gas, water, hot water or heating usages is read and collected by a metering device and transmitted to an automatic meter reading (AMR) server, re-request and collect meter data in the data non-reading interval from the AMR server, and improve the validity of meter data values so as to provide real-time response data on consumers by an energy data correction enhancement system correcting meter data using an estimated approximate value based on a history of accumulated meter data when no meter data is found in the non-reading interval despite the re-request.

According to an aspect of the present invention, there is provided a method of correcting meter reading data for enhancement of electricity data management of a photovoltaic module, the method including reading energy usage of a consumer by a meter and transmitting meter data on the energy usage to an automatic meter reading (AMR) server, monitoring, by a meter data management system, an error in the transmitted meter data and a non-reading interval, re-requesting collection of an error in meter data and a non-reading interval to the AMR server, and correcting the error in the meter data and the non-reading interval using an estimated approximate value based on a history of previous meter data accumulated in a database of the AMR server when an error and a non-reading interval are found even after meter data is collected on the re-requesting.

The reading of the energy usage of the consumer through the meter and transmitting of the meter data on the energy usage to the AMR server may include generating electricity data by a photovoltaic module and gathering the electricity data, and converting the electricity data on direct current (DC) power into alternating current (AC) power and transmitting the converted electricity data to the consumer.

The meter data on the energy usage may be stored and managed in the AMR server by minutes, hours, days, months and years, and be maintained and managed as an energy load profile in the AMR server.

The monitoring, by the meter data management system, of the error in the transmitted meter data and the non-reading interval may monitor an energy load profile based on an analysis result of accumulated states of energy load profiles and consumer profiles by the meter data management system, and request analysis of the error and the non-reading interval to the energy data correction enhancement system when the error in the meter data and the non-reading interval are identified.

The re-requesting of collection of the error in the meter data and the non-reading interval to the AMR server may extract the error in the meter data and the non-reading data by intervals by the energy data correction enhancement system to re-request collection of meter data on the non-reading interval to the AMR server while the AMR server recollects and accumulates meter data on the interval from the meter.

The correcting of the error in the meter data and the non-reading interval may correct the error in the meter data and the non-reading interval using the error in the meter data and meter data at a start time and an end time of the non-reading interval and enhance the error in the meter data and the non-reading interval using a correction result after verifying that the correction result is included in a valid range of a history of previous meter data.

The method may define linear functions touching a meter data pattern at points of 'the start time of the error or the non-reading interval −a 1 unit time' and 'the end time of the error or the non-reading interval +a 1 unit time' and acquire an intersecting point of the two linear functions.

The method may generate a function connecting three sets of coordinates of the points of 'the start time of the error or the non-reading interval −a 1 unit time' and 'the end time of the error or the non-reading interval +a 1 unit time' and the intersecting point and acquire corrected and enhanced meter data at the points.

The method may compare the corrected and enhanced meter data with meter data at the same time of a previous day or a statistic value of the history of previous meter data at the same time, and correct and enhance the error in the meter data and the non-reading interval by determining a value between a maximum value and a minimum value of the history as a corrected and enhanced meter data value when the corrected and enhanced meter data has the value.

According to an aspect of the present invention, there is provided an apparatus for correcting meter reading data, the apparatus including an AMR server to receive meter data on energy usage of a consumer read by a consumer energy generation and reading apparatus, a meter data management system to monitor an error in the meter data and a non-reading interval, and an energy data correction enhancement system to analyze the error in the meter data and the non-reading interval to re-request collection of meter data to the AMR server, and to generate corrected and enhanced meter data and to correct and enhance the error and the non-reading interval using the meter data recollected from the AMR server.

The consumer energy generation and reading apparatus may include a photovoltaic module to generate electricity data for a consumer, a connection board to gather the electricity data, an inverter to convert the gathered electricity data on DC power into AC power and supply the data to the consumer, and a meter to measure energy usage of the consumer by minutes, hours, days, months and years.

The AMR server may store and manage the meter data on the energy usage by minutes, hours, days, months and years, and maintain, manage and store the meter data on the energy usage as an energy load profile.

The meter data management system may monitor an energy load profile based on an analysis result of accumulated states of energy load profiles and consumer profiles by the meter data management system, and request analysis of the error and the non-reading interval to the energy data correction enhancement system when the error in the meter data and the non-reading interval are identified.

The energy data correction enhancement system may correct the error in the meter data and the non-reading interval using an estimated approximate value based on a history of previous meter data accumulated in a database of the AMR when an error and a non-reading interval are found even after meter data is collected on a re-request for collection of meter data to the AMR server.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments will be described in detail with reference to the accompanying drawings.

Figure 1:
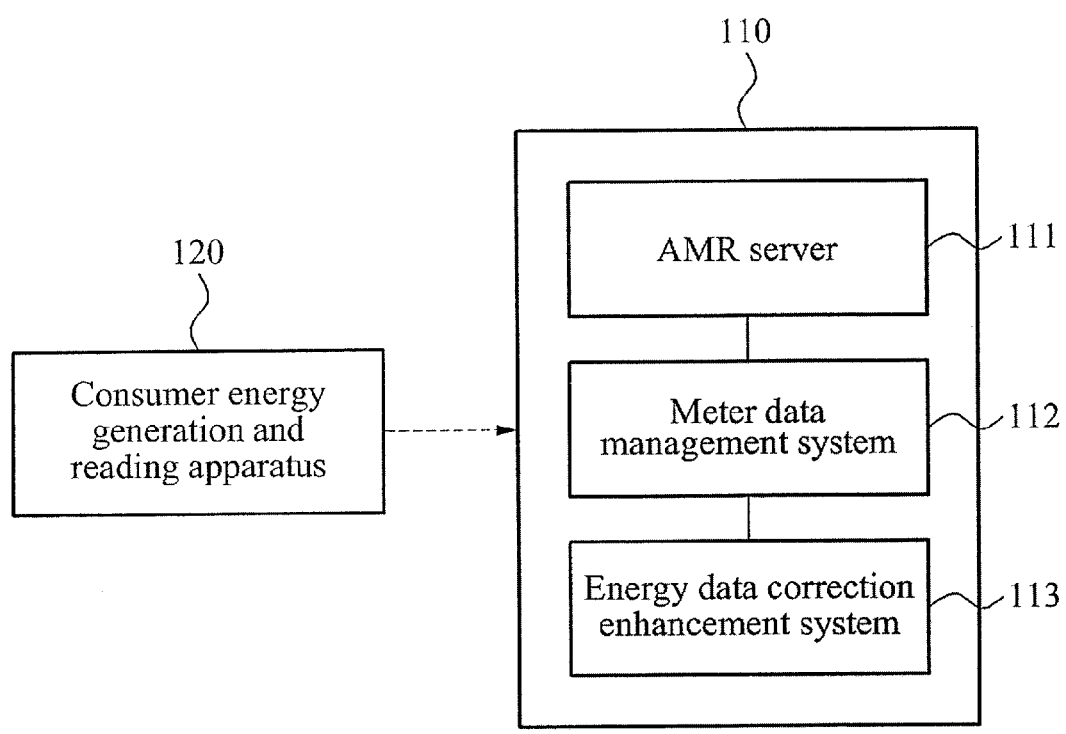
FIG. 1 illustrates a configuration of an apparatus for correcting meter data for enhancement of electricity data management of a photovoltaic module.

FIG. 1 illustrates a configuration of an apparatus 110 for correcting meter data for enhancement of electricity data management of a photovoltaic module. Hereinafter, the apparatus for correcting meter data may also be referred to as a meter data correction apparatus.

Referring to FIG. 1, the meter data correction apparatus 110 includes an automatic meter reading (AMR) server 111, a meter data management system 112 and an energy data correction enhancement system 113.

The AMR server 111 receives meter data on energy usage of a consumer read by a consumer energy generation and reading apparatus 120.

The consumer energy generation and reading apparatus 120 is described below with reference to FIG. 2.

Figure 2:
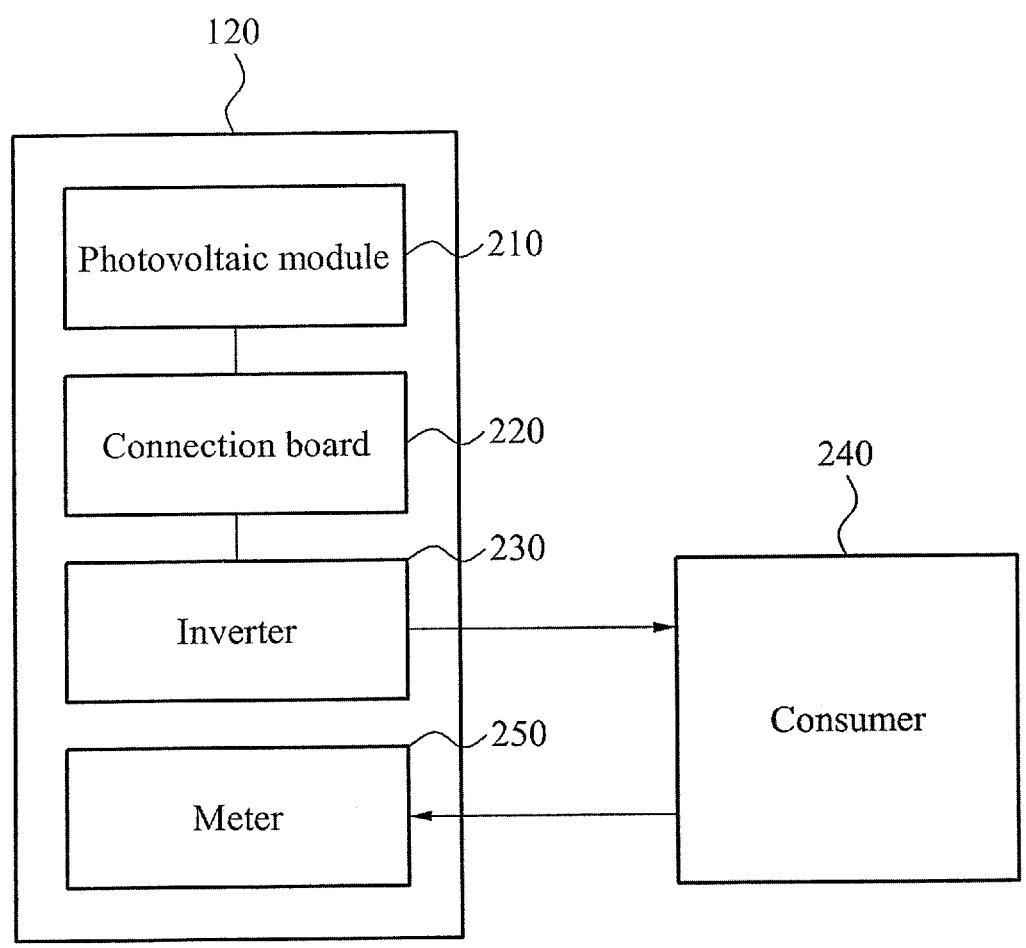
FIG. 2 illustrates a configuration of the consumer energy generation and reading apparatus according to an exemplary embodiment.

FIG. 2 illustrates a configuration of the consumer energy generation and reading apparatus 120 according to an exemplary embodiment.

Referring to FIG. 2, the consumer energy generation and reading apparatus 120 may include a photovoltaic module 210, a connection board 220, an inverter 230 and a meter 250.

The photovoltaic module 210 generates electricity data to be transmitted to a consumer 240.

The connection board 220 gathers electricity data on direct current (DC) power transmitted from the photovoltaic module 210.

The inverter 230 converts the gathered electricity data on DC power into alternating current (AC) power and supplies the data to the consumer 240.

The meter 250 measures energy usage by minutes, hours, days, months and years. The meter 250 transmits measured meter data to the AMR server according to a request from the AMR server.

The AMR server 111 may store and manage the received meter data on the energy usage by minutes, hours, days, months and years in a database of the AMR server 111. The meter data on the energy usage stored and managed may be maintained and managed as an energy load profile in the AMR server 111.

The meter data management system 112 monitors an error in the received meter data and a non-reading interval. The meter data management system 112 may monitor and synchronize energy load profiles by consumers from the AMR server and consumer profiles as customer information. The meter data management system 112 may analyze and manage history information on meter data on consumers previously collected and accumulated. When an error in meter data and a data non-reading interval are found during monitoring and synchronization, the meter data management system 112 requests analysis of the data non-reading interval to the energy data correction enhancement system 113.

The energy data correction enhancement system 113 analyzes the error in the meter data and the non-reading interval and re-requests collection of meter data to the AMR server.

When an error and a non-reading interval are found even after meter data is collected on re-request for collection of meter data, the energy data correction enhancement system 113 corrects the error in the meter data and the non-reading interval using an estimated approximate value based on a history of previous meter data accumulated in the database of the AMR server. The energy data correction enhancement system 113 transmits corrected and enhanced meter data of non-reading data by intervals to the meter data management system 112.

The meter data management system 112 verifies a result of correcting meter data on the data non-reading interval and makes a correction request about whether meter data on an energy load profile and a consumer profile is included in a valid period of the meter data history to the energy data correction enhancement system 113. The energy correction enhancement system 113 generates corrected and enhanced meter data calculated based on meter data at a start time and an end time of the non-reading interval so as to correct the meter data on the data non-reading interval.

Figure 3:
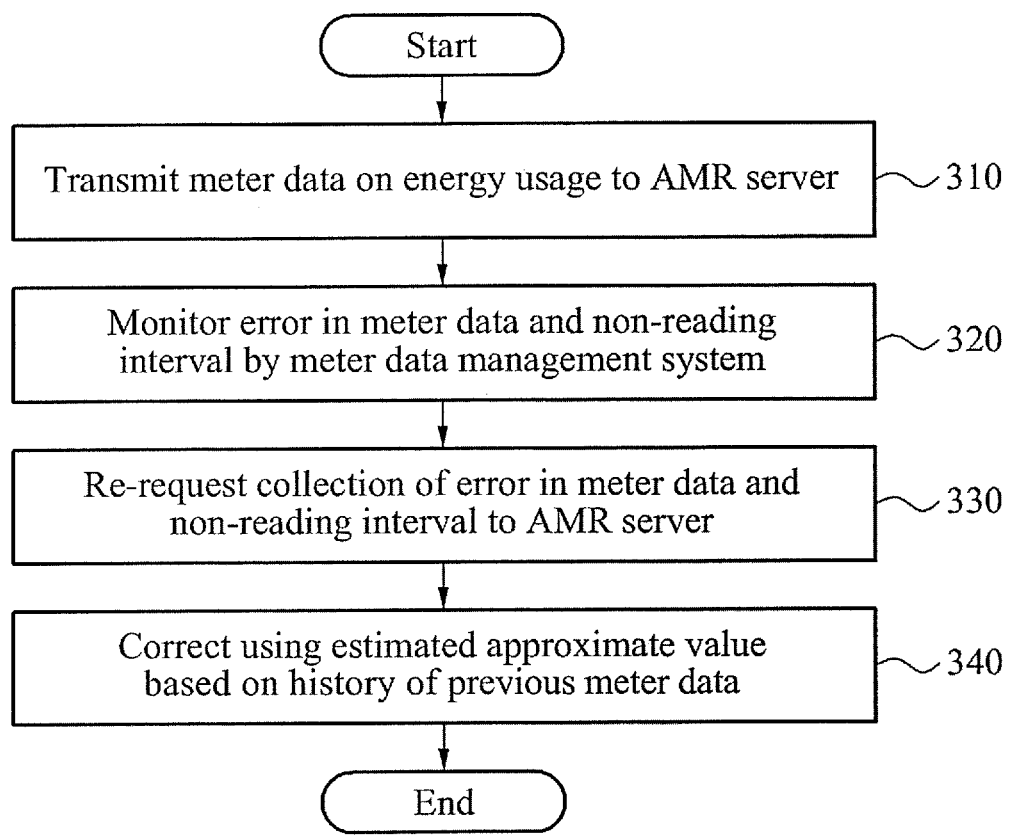
FIG. 3 is a flowchart illustrating a method of correcting meter data for enhancement of electricity data management of a photovoltaic module.

FIG. 3 is a flowchart illustrating a method of correcting meter data for enhancement of electricity data management of a photovoltaic module. Hereinafter, the method of correcting meter data may also be referred to as a meter data correction method.

The meter data correction method for enhancement of electricity data management of the photovoltaic module, which is for stably managing electricity data by correcting an error and meter data on a data non-reading interval, includes reading energy usage of a consumer by a meter and transmitting meter data on the energy usage to an AMR server in operation 310, monitoring, by a meter data management system, an error in the transmitted meter data and a non-reading interval in operation 320, re-requesting collection of an error in meter data and a non-reading interval to the AMR server in operation 330, and correcting the error in the meter data and the non-reading interval using an estimated approximate value based on a history of previous meter data accumulated in a database of the AMR when an error and a non-reading interval are found even after meter data is collected on the re-requesting in operation 340.

The AMR server of the meter data correction apparatus collects the meter data on the energy usage of the consumer read by the meter in operation 310. The collected meter data on the energy usage may be stored and managed in an energy usage database by minutes, hours, days, months and years of the AMR server. The stored and managed meter data on the energy usage may be maintained and managed as an energy load profile in the AMR server.

The reading of the energy usage of the consumer through the meter and transmitting of the meter data on the energy usage to the AMR server may include generating electricity data by a photovoltaic module and gathering the electricity data, and converting the electricity data on direct current (DC) power into alternating current (AC) power and transmitting the converted electricity data to the consumer. Energy used by the consumer is transmitted to the consumer by the photovoltaic module generating and gathering the electricity data and by converting the electricity data on DC power into AC power.

The meter data management system monitors the error in the collected meter data and the non-reading interval in operation 320. The meter data management system may monitor and synchronize energy load profiles by consumers from the AMR server and consumer profiles as customer information. The meter data management system may analyze and manage history information on meter data on consumers previously collected and accumulated. When an error in meter data and a data non-reading interval are found during monitoring and synchronization, the meter data management system requests analysis of the data non-reading interval to an energy data correction enhancement system.

The energy data correction enhancement system extracts non-reading data by intervals and re-requests recollection of meter data on a non-reading interval to the AMR server in operation 330. The AMR server of each company recollects and accumulates meter data on the interval from a meter of each consumer on the request for recollection of non-reading.

When there is the recollected meter data, a value of the recollected meter data is used as meter data on the non-reading interval. When an error and a non-reading interval are found even after meter data is recollected on the re-request, the energy data correction enhancement system corrects the error in the meter data and the non-reading interval using an estimated approximate value based on a history of previous meter data accumulated in the database of the AMR server in operation 340. The energy data correction enhancement system transmits a result of correcting and enhancing non-reading data by intervals to the meter data management system.

The meter data management system verifies a result of correcting the meter data on the data non-reading interval and makes a correction request about whether a value of the meter data on an energy load profile and a consumer profile is included in a valid period of the meter data history to the energy data correction enhancement system. In order to correct the meter data on the data non-reading interval, the meter data is basically corrected and enhanced by being calculated based on meter data at a start time and an end time of the non-reading interval. To correct and enhance the meter data on the non-reading interval to secure the validity, the corrected meter data is enhanced based on an energy usage history of the consumer at a corresponding time of a previous day or a corresponding time of the day before. The energy data correction enhancement system enhances the corrected meter data and an enhanced result to the meter data management system. The energy data correction enhancement system transmits statistical analysis information on energy load profiles to an energy information display screen of the consumer.

Figure 4:
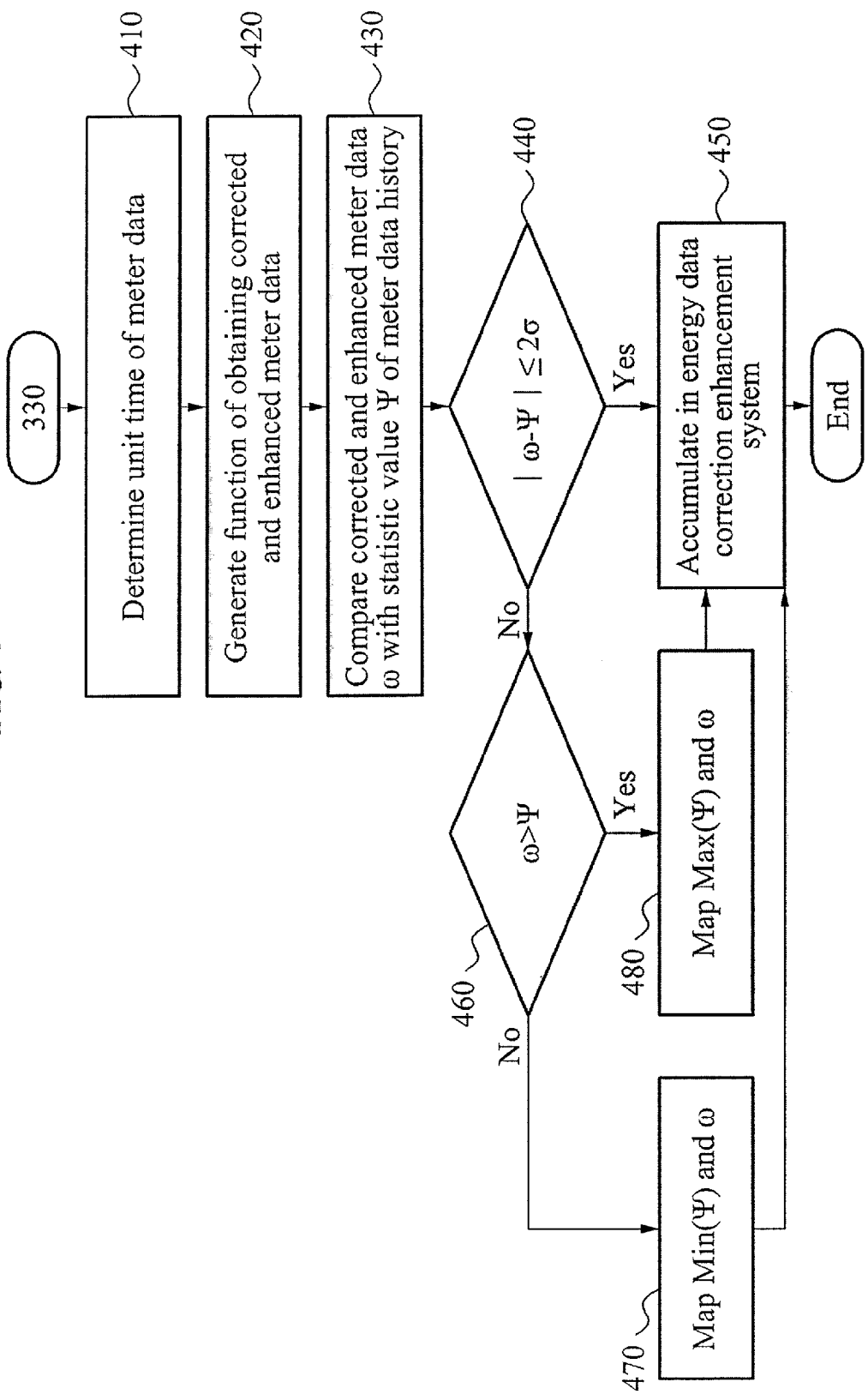
FIG. 4 is a flowchart illustrating a correcting process using an estimated approximate value based on a history of previous meter data according to an exemplary embodiment.

FIG. 4 is a flowchart illustrating a correcting process using an estimated approximate value based on a history of previous meter data according to an exemplary embodiment.

The meter data management system monitors an energy load profile based on an analysis result of accumulated states of energy load profiles and consumer profiles and verifies a data non-reading interval. For example, a meter data of 0 or lower on a house of a resident consumer may be determined as a data non-reading interval. The meter data management system re-requests meter data with respect to an error in meter data and the non-reading data, and determines unit time of the meter data when an error and a non-reading interval are found even after the meter data is collected upon the re-request in operation 410. The unit time of meter data may be minute, hour, day, month and year.

After determining the unit time, a function of acquiring corrected and enhanced meter data is generated in operation 420. To generate the function of acquiring the enhanced meter data, the data non-reading interval may be defined as follows. For instance, a start time of non-reading data is defined as α, an end time of the non-reading data as β. When the non-reading data is temporal meter data, a linear function touching meter data at a point of 'the end time of the non-reading data +a 1 unit time' is defined. Also, a linear function touching meter data at a point of 'the start time of the non-reading data −a 1 unit time' is defined. Here, unit time may be minute, hour, day, month and year. Here, an intersecting point of the two linear functions may be obtained, and a maximum point and a minimum point of the intersecting point may be determined based on a function model. Thus, the following three (x, y) coordinates may be obtained, which are (x, y) coordinates at 'the end time of the non-reading data −a 1 unit time,' (x, y) coordinates of a maximum or minimum value of the intersecting point, and (x, y) coordinates at 'the end time of the non-reading data +a 1 unit time.' Then, a function connecting the three coordinates may be generated, and corrected and enhanced meter data at each corresponding time may be acquired.

Subsequently, the corrected and enhanced meter data ω to is compared with a statistic value ψ of a meter data history in operation 430. The corrected and enhanced meter data is estimated meter data and thus is compared with a statistic value of the meter data history at a corresponding time of a previous day or the day before to determine whether the meter data is included in a preset valid range.

The corrected and enhanced meter data ω is compared with the statistic value ψ of the meter data history, and a difference between the two values is compared with a preset value in operation 440.

Here, the preset value may be in a range of a double standard deviation 2□ of the statistic value of the meter data history.

When the difference between the two values is smaller than or equal to the preset value, the error in the meter data and the non-reading data are corrected in view of the corrected and enhanced value. The corrected meter data may be accumulated in the corrected database on the AMR server in operation 450.

Meanwhile, when the difference between the two values is greater than the preset value in operation 460 and the corrected and enhanced meta data is greater than a maximum value of the statistic value of the history, the corrected meter data may be determined as a maximum statistic value Max(ψ) of the history at the corresponding time in operation 480 and be accumulated in the corrected database on the AMR server in operation 450.

However, when the corrected and enhanced meta data is smaller than a minimum value of the statistic value of the history, the corrected meter data may be determined as a minimum statistic value Min(ψ) of the history at the corresponding time in operation 470 and be accumulated in the corrected database on the AMR server in operation 450.

Figure 5:
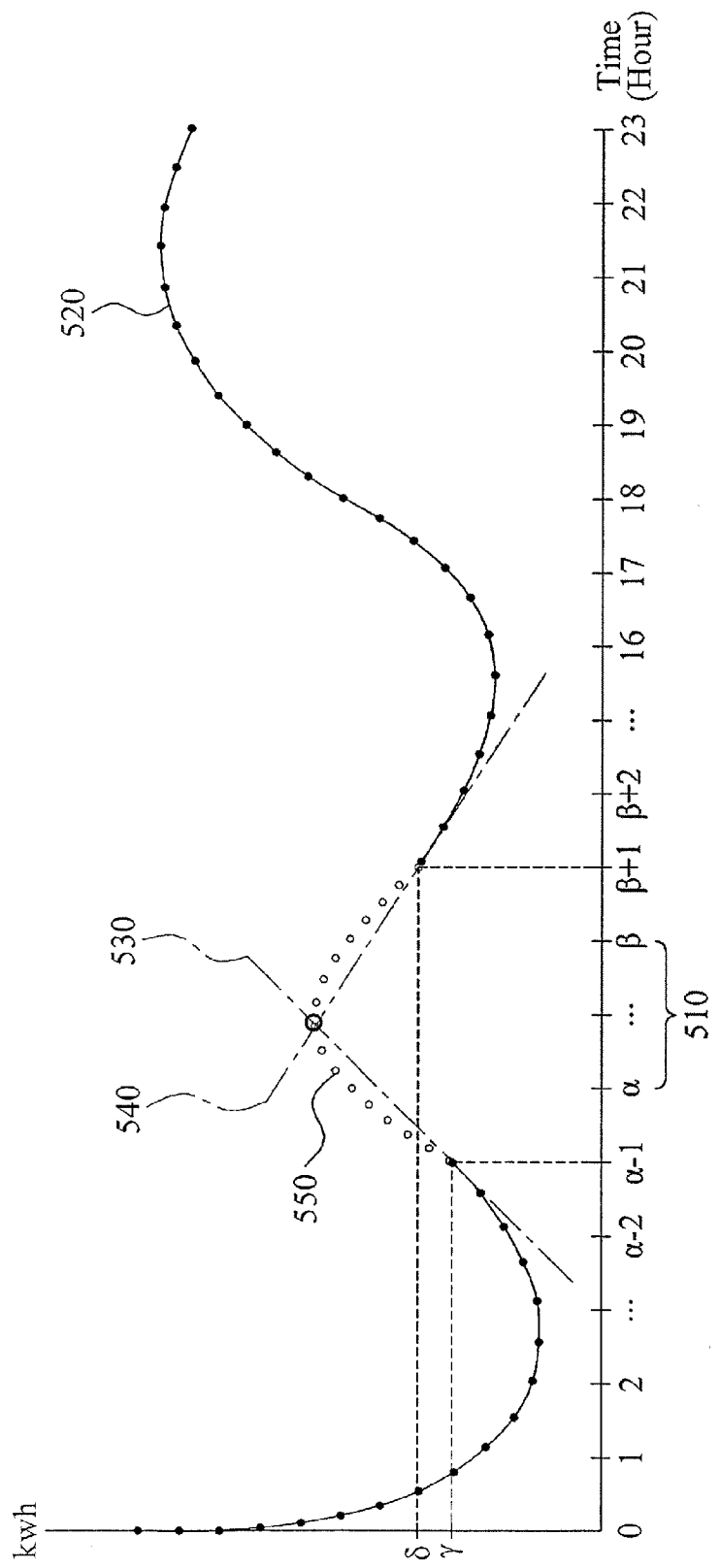
FIG. 5 illustrates a method of generating corrected and enhanced meter data according to an exemplary embodiment.

FIG. 5 illustrates a method of generating corrected and enhanced meter data according to an exemplary embodiment.

For instance, meter data at a time from 0 to (α−1) may be present, while meter data collected by the AMR at a time from α to β server may be determined as a value 0 or smaller. FIG. 5 shows a data non-reading interval 510 from α to β having a meter data value of 0 as a result of monitoring by the meter data management system. Also, meter data is stably collected and monitored after a time of (β+1), thereby displaying valid meter data. Temporal meter data may be determined to respond demand with respect to energy usage of a consumer in real time.

An approximation method for remote correction and enhancement of non-reading data is present as follows so as to effectively check energy usage of a consumer. A function 520 exhibiting a pattern as shown in FIG. 5 may be generalized to $$y = ax^n + bx^{n-1} + cx^{n-2} + \ldots + a'x + b'.$$

A linear function 530 touching the generalized polynomial function of degree n at a time of (α−1) may be $$y = \{an(\alpha-1)^{n-1} + b(n-1)(\alpha-1)^{n-2} + c(n-2)(\alpha-1)^{n-3} + \ldots + a'\}x + \gamma - \{an(\alpha-1)^{n-1} + b(n-1)(\alpha-1)^{n-2} + c(n-2)(\alpha-1)^{n-3} + \ldots + a'\}(\alpha-1)$$

so as to correct meter data in the data non-reading interval 510 from α to β having a meter data value of 0. That is, when an x coordinate is (α−1), a y coordinate is γ. Thus, a linear function touching coordinates (α−1, γ) may be obtained. Here, a slope of the linear function 530 touching at the time of (α−1) may be obtained from a derivative of the function 520, which is $$y' = an(\alpha-1)^{n-1} + b(n-1)(\alpha-1)^{n-2} + c(n-2)(\alpha-1)^{n-3} + \ldots + a'.$$

Further, a linear function 540 touching at a time of (β+1) may be $$y = \{an(\beta+1)^{n-1} + b(n-1)(\beta+1)^{n-2} + c(n-2)(\beta+1)^{n-3} + \ldots + a'\}x + \delta - \{an(\beta+1)^{n-1} + b(n-1)(\beta+1)^{n-2} + c(n-2)(\beta+1)^{n-3} + \ldots + a'\}(\beta+1).$$

That is, when an x coordinate is (β+1), a y coordinate is δ. Thus, a linear function 540 touching the coordinate (β+1) may be obtained. Here, a slope of the linear function 540 touching at the coordinate of (β+1) may be obtained from a derivative of the function 520, which is $$y' = an(\beta+1)^{n-1} + b(n-1)(\beta+1)^{n-2} + c(n-2)(\beta+1)^{n-3} + \ldots + a'.$$

Subsequently, coordinates (x', y') of an intersecting point of the two linear functions may be acquired.

A function connecting the three sets of coordinates (α−1, γ), (x', y') and (β+1, δ) may be derived. That is, $$x' = \frac{\{na(\beta+1)^{n-1} + \ldots + a'\}(\beta+1) - \{na(\alpha-1)^{n-1} + \ldots + a'\}(\alpha-1) + \gamma - \delta}{\{na(\beta+1)^{n-1} + \ldots + a'\} - \{na(\alpha-1)^{n-1} + \ldots + a'\}}$$

$$y' = \frac{\{na(\beta+1)^{n-1} + \ldots + a'\}[\{na(\beta+1)^{n-1} + \ldots + a'\}(\beta+1) - \{na(\alpha-1)^{n-1} + \ldots + a'\}(\alpha-1) + \gamma - \delta]}{\{na(\beta+1)^{n-1} + \ldots + a'\} - \{na(\alpha-1)^{n-1} + \ldots + a'\}} +$$

$$\delta - \{na(\beta+1)^{n-1} + \ldots + a'\}(\beta+1).$$

Thus, a quadric function connecting the three sets of coordinates may be shown as a pattern 550 of FIG. 5. The pattern 550 may be referred to as an estimated function of meter data approximate values and may be used in inferring a meter data value at a non-reading time to generate corrected ad enhanced meter data.

Figure 6:
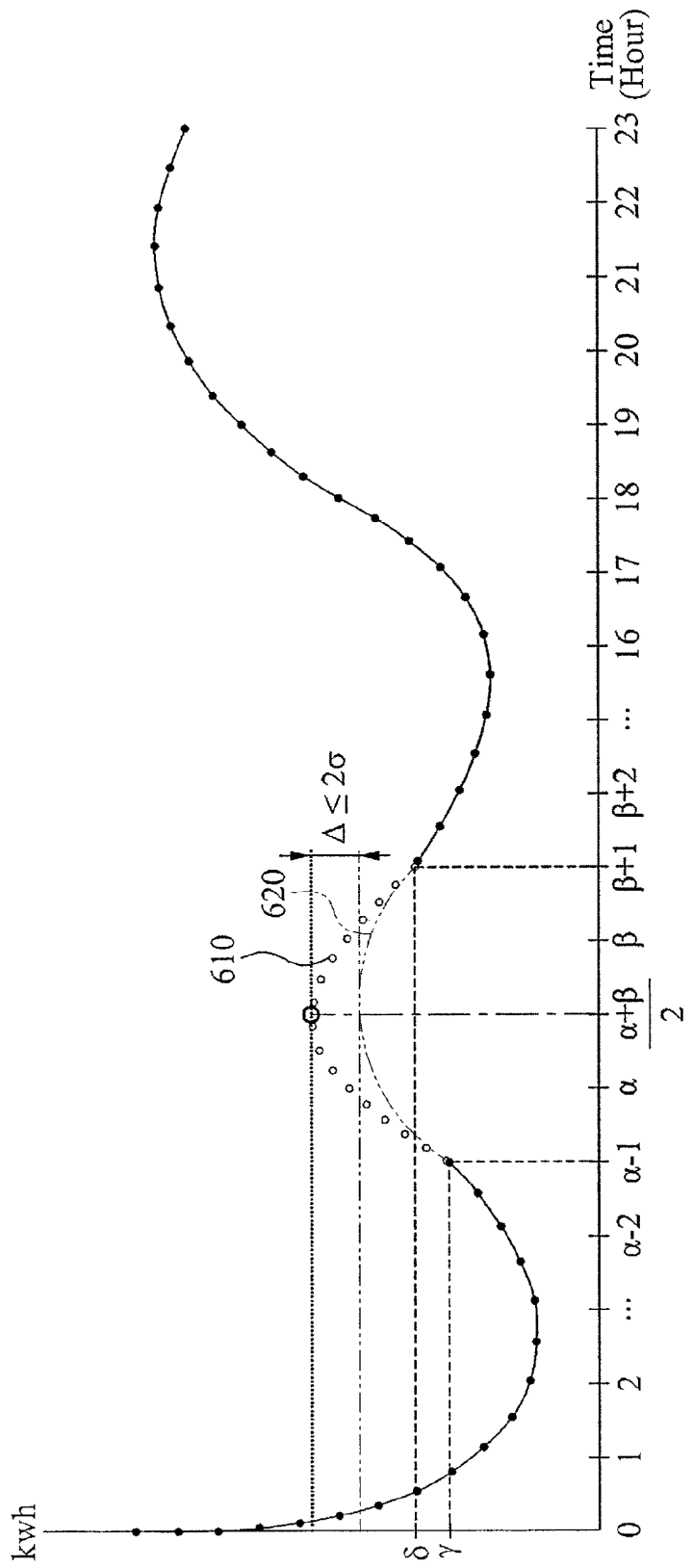
FIG. 6 illustrates a method of correcting and enhancing an error in meter data and a non-reading interval by comparing corrected and enhanced meter data according to an exemplary embodiment.

FIG. 6 illustrates a method of correcting and enhancing an error in meter data and a non-reading interval by comparing corrected and enhanced meter data according to an exemplary embodiment.

A pattern 610 is a function of correcting an approximate value as corrected and enhanced data of non-reading data, and a pattern 620 illustrates a statistic meter data value of a history or at a corresponding time of a previous day. A value of the correcting function by inferring meter data in a data non-reading interval may be different from the statistic value of the history. A corrected value at a time α or β may have a smaller error, while corrected values in an interval from α to β may have a relatively large error. Here, in the interval from α to β, the corrected values may be greater or smaller than statistic values.

A difference Δ between an approximate corrected value as the corrected and enhanced meter data and a statistic value is selected within a valid range to choose corrected and enhanced meter data on the non-reading interval.

For example, when a difference Δ between an approximate corrected value and the statistic value at the same time in a range of a double standard deviation 2□ of the statistic value of the history, the approximate corrected value may be determined valid and corrected meter data may be accumulated in a corrected database of the AMR server. When a value of the corrected meter data is greater than a maximum value of the statistic value of the history, the value of the corrected meter data may be determined as a maximum statistic value of the history at the same time and accumulated in the corrected database of the AMR server. However, when the value of the corrected meter data is smaller than a minimum value of the statistic value of the history, the value of the corrected meter data may be determined as a minimum statistic value of the history at the same time and accumulated in the corrected database of the AMR server. Such a mechanism is provided to enable an energy provider to estimate energy demand in response to demand from a consumer according to time.

According to exemplary embodiments, a meter data management system corrects and enhances electricity data in a non-reading interval with respect to an error that may occur in a communication medium between a meter and an AMR server and in data transmission, thereby efficiently monitoring energy usage of consumers and building a database of meter data in a valid range to be used as demand response data.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A method of correcting meter reading data, the method comprising:
   reading energy usage of a consumer by a meter and transmitting meter data on the energy usage to an automatic meter reading (AMR) server;
   monitoring, by a meter data management system, an error in the transmitted meter data and a non-reading interval;
   re-requesting collection of an error in meter data and a non-reading interval to the AMR server; and
   correcting the error in the meter data and the non-reading interval using an estimated approximate value based on a history of previous meter data accumulated in a database of the AMR server when an error and a non-reading interval are found even after meter data is collected on the re-requesting, wherein the correcting of the error in the meter data and the non-reading interval corrects the error in the meter data and the non-reading interval using the error in the meter data and meter data at a start time and an end time of the non-reading interval and enhances the error in the meter data and the non-reading interval using a correction result after verifying that the correction result is included in a valid range of a history of previous meter data, and wherein the method defines linear functions touching a meter data pattern at points of 'the start time of the error or the non-reading interval −a 1 unit time' and 'the end time of the error or the non-reading interval +a 1 unit time and acquires an intersecting point of the two linear functions.

2. The method of claim 1, wherein the method generates a function connecting three sets of coordinates of the points of 'the start time of the error or the non-reading interval −a 1 unit time' and 'the end time of the error or the non-reading interval +a 1 unit time' and the intersecting point and acquires corrected and enhanced meter data at the points.

3. The method of claim 2, wherein the method compares the corrected and enhanced meter data with meter data at the same time of a previous day or a statistic value of the history of previous meter data at the same time, and corrects and enhances the error in the meter data and the non-reading interval by determining a value between a maximum value and a minimum value of the history as a corrected and enhanced meter data value when the corrected and enhanced meter data has the value.

4. The method of claim 1, wherein the reading of the energy usage of the consumer through the meter and transmitting of the meter data on the energy usage to the AMR server comprises generating electricity data by a photovoltaic module and gathering the electricity data, and converting the electricity data on direct current (DC) power into alternating current (AC) power and transmitting the converted electricity data to the consumer.

5. The method of claim 1, wherein the meter data on the energy usage is stored and managed in the AMR server by minutes, hours, days, months and years, and maintained and managed as an energy load profile in the AMR server.

6. The method of claim 1, wherein the monitoring, by the meter data management system, of the error in the transmitted meter data and the non-reading interval monitors an energy load profile based on an analysis result of accumulated states of energy load profiles and consumer profiles by the meter data management system and requests analysis of the error and the non-reading interval to the energy data correction enhancement system when the error in the meter data and the non-reading interval are identified.

7. The method of claim 1, wherein the re-requesting of collection of the error in the meter data and the non-reading interval to the AMR server extracts the error in the meter data and the non-reading data by intervals by the energy data correction enhancement system to re-request collection of meter data on the non-reading interval to the AMR server while the AMR server recollects and accumulates meter data on the interval from the meter.

8. The method of claim 1, wherein the correcting of the error in the meter data and the non-reading interval corrects the error in the meter data and the non-reading interval using the error in the meter data and meter data at a start time and an end time of the non-reading interval and enhances the error in the meter data and the non-reading interval using a correction result after verifying that the correction result is included in a valid range of a history of previous meter data.

* * * * *